May 2, 1950     H. J. AGEE ET AL     2,506,054
ROTARY BEATER TOPPER FOR VEGETABLE PLANTS
Filed April 29, 1948     3 Sheets-Sheet 1
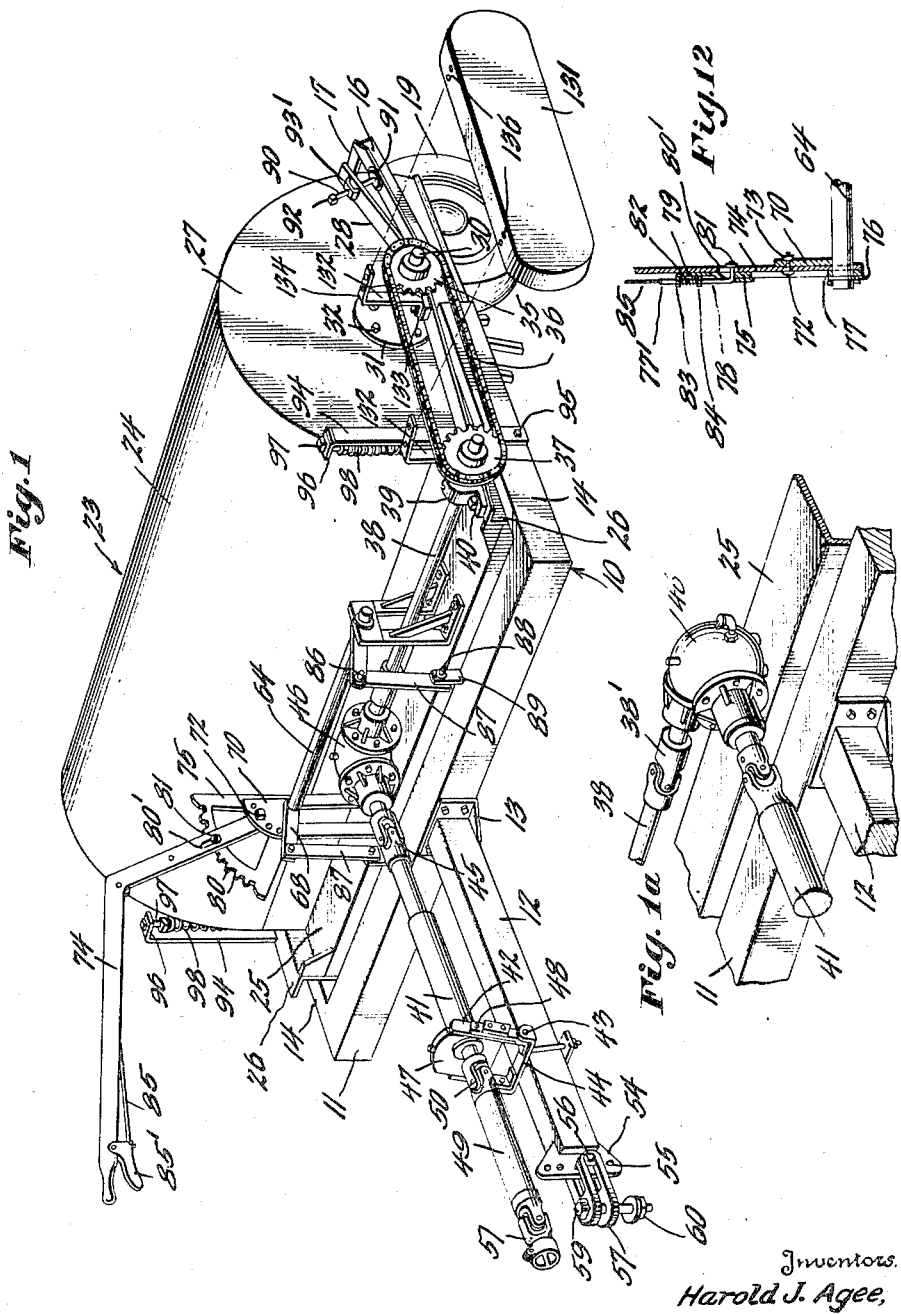
Inventors.
Harold J. Agee,
Paul K. Cowgill & John D. Gordon
By Cushman Darby & Cushman
Attorneys

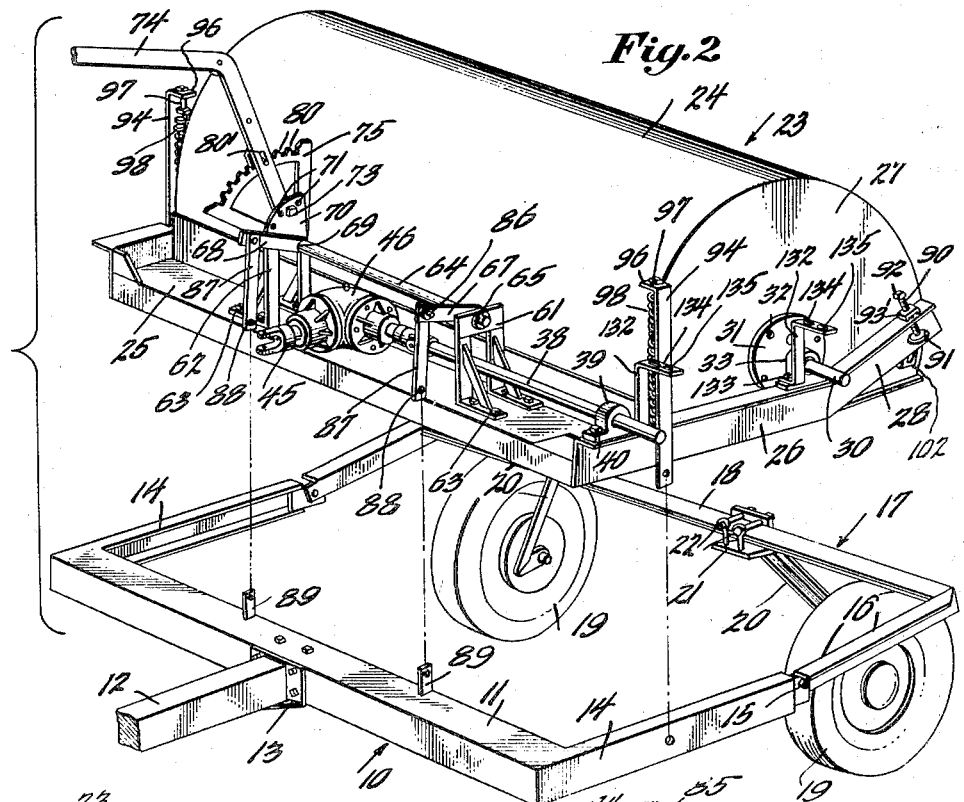

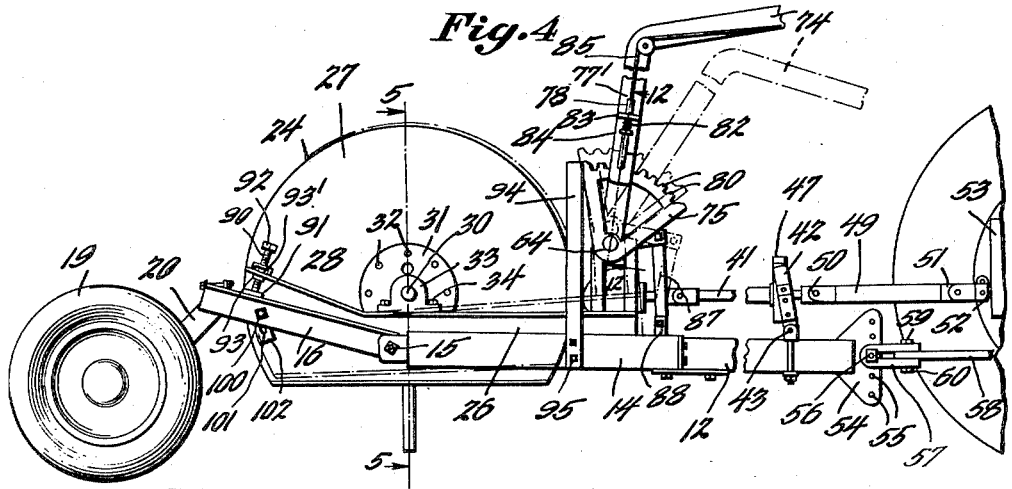

Patented May 2, 1950

2,506,054

UNITED STATES PATENT OFFICE 2,506,054

ROTARY BEATER TOPPER FOR VEGETABLE PLANTS

Harold J. Agee, Paul K. Cowgill, and John D. Gerdon, Boise, Idaho, assignors to Olson Manufacturing Company, Boise, Idaho, a corporation of Idaho Application April 29, 1948, Serial No. 23,968

10 Claims. (Cl. 56—121.4)

The present invention relates to agricultural machines, and more particularly, to an improved rotary beater for removing the tops or appendages of vegetable plants and the like, as the machine travels over a field.

An important object of the invention consists in providing an agricultural machine having a wheel supporting frame on which is movably mounted a flail housing that carries rotatable flails or beaters arranged to de-vine and disintegrate all surface vegetation engaged by the flails during the operation of the machine. Additionally, means are provided at both the front and rear of the flail housing for adjustably supporting the same, so that the flails may be moved and maintained the proper distance from the ground in order to obtain maximum efficiency when in operation.

A further object consists in a new and improved flail or flexible beater for removing the tops of vegetable plants and the like, and which preferably is formed of solid or of one-piece molded rubber or rubberized material, to provide relatively thick, heavy, flexible flails for removing the tops of the plants without damaging the roots or body parts thereof. The flails while normally relatively rigid are sufficiently yieldable to pass over obstructions such as rocks and tree stumps without damaging the flail.

Other objects and advantages of the invention will become apparent from the following description when taken in conjunction with the accompanying claims and drawings.

Referring to the drawings which show several preferred embodiments the invention may assume:

Figure 1 is a front perspective view of the improved rotary beater with the chain housing removed for clearness of illustration.

Figure 1a is a detail perspective view showing the gear box and its associated parts in Figure 1 in their reverse position.

Figure 2 is a perspective disassembled or exploded view of the main frame and the flail housing.

Figure 3 is a rear perspective view of the assembled machine.

Figure 4 is a side view showing the operating lever in full lines in its normal inoperative position and in dotted lines moved to raise the flail housing and the flails away from the ground.

Figure 5 is a sectional view taken substantially along the line 5—5 of Figure 4.

Figure 6 is a detail perspective view of the flail rotor or drum.

Figure 7 is a view similar to Figure 6 showing a modified form of flail rotor.

Figure 8 is a perspective view of a flail formed of solid rubber.

Figure 9 is a detail view of the upper end portion of a modified form of flail.

Figure 10 is a perspective view of a further modification of a flail.

Figure 11 is a perspective view of the lower end portion of another modification of flail.

Figure 12 is a sectional view taken substantially along the line 12—12 of Figure 4, and Figure 13 is a detail perspective view of an adjustable wheel clamping member.

Referring to the drawings in which like numerals indicate like parts in the several views, 10 designates the main supporting frame of an agricultural machine that is arranged to travel along a row of vegetable plants or the like, and which may be substantially of U-shape having a transverse front channel member 11, to which centrally is connected a tongue or draw bar 12 as at 13. Spaced side channel members 14 extend rearwardly from the transverse member 11 and are pivotally connected as at 15 to side members 16 of a substantially U-shaped rear supporting frame 17. The frame 17 has a cross member 18 to which may be slidably connected, the wheels 19 by the arms 20 and the L-shaped clamping members 21. Each of the clamping members 21 is of such a size and shape as to slidably receive the transverse bar 18 and be firmly maintained in any desired fixed position thereon by the threaded bolts 22 and the eye bolts 21' (Fig. 13), or other suitable clamping means.

A flail housing assembly generally indicated by the numeral 23 is mounted on the machine and preferably comprises a curved hood 24 which terminates at its forward end in a substantially horizontal transverse flange or member 25 that extends between the side members 14. Angle bars or members 26 are welded or otherwise suitably connected to the opposed sides of the transverse flange 25 and the lower edges of the ends 27 of the hood 24. The rear end portions of the bars 26 are inclined upwardly as at 28. Thus, it will be seen that the hood 24, the transverse flange 25 and side bars 26, are connected to provide a unitary structure when mounted on the front and rear frames 10 and 17. A rotor or drum 29 extends transversely within the housing 24 (Fig. 5) and may terminate in reduced end portions or axles 30 which project through central openings in the ends 27 of the housing 24 and also through the discs or plates 31 which are connected to the ends 27 in any suitable manner such as by the bolts 32. Bearing blocks 33 (Fig. 3) are mounted on the side bars 26 by the bolts 34 so as to constitute supports for the axles 30 of the flail rotor 29. A sprocket wheel 35 is keyed to one of the axles 30 and is engaged by an endless chain 36 which engages a spaced sprocket wheel 37 keyed to a transverse drive shaft 38 that is mounted at its outer end in a bearing block 39 connected as at 40 to the adjacent side bar 25. A drive shaft 41 is carried in a movable U-shaped cradle 42 which is pivoted as at 43 to a clamp 44 that is secured to the tongue or draw bar 12. The inner end of the drive shaft 41 is connected through a universal joint 45 with a gear box 46 which in turn is similarly connected to the drive shaft 38. The forward end of the shaft 41 (Fig. 1) is connected to a bearing block 47 which is pivoted as at 48 to the cradle 42 and is also connected to the rear end of a propeller shaft 49 by a universal joint connection 50. The shaft 49 in turn is connected by a universal joint 51 to a power take-off shaft 52 of a tractor or the like 53 (Fig. 4). The tongue or draw bar 12 at its forward end is connected to a plate 54 provided with vertically disposed spaced openings 55 arranged to adjustably receive a bolt 56 carried by a hitch clevis 57 which in turn is detachably connected to a rearwardly extending bar 58 of the tractor by the threaded bolt 59 and the nut 60.

On the transverse horizontal flange 25 of the housing 24, are mounted a pair of substantially L-shaped supporting brackets 61 and 62 (Fig. 2) which are secured as at 63 to the flange or base 25 and receive a transverse rotatable rock shaft 64 which is secured at one end as at 65 to the adjacent bracket 61. The opposite end of the shaft 64 extends through an opening of the adjacent supporting frame 62. The shaft 64 has extending outwardly therefrom, spaced parallel cranks 67 and 68, which preferably are welded as at 69 to the shaft 64 but may be otherwise suitably secured thereto. The crank 68 has extending upwardly therefrom a segmental plate 70 provided with circumferentially spaced openings 71 arranged to selectively receive a threaded bolt 72 that carries a clamping nut 73 (Fig. 12) and which is connected to the lower end portion of an operating lever 74. A height adjusting quadrant 75 is fixed to one end of the rock shaft 64 as at 76 so as to be rotatable therewith. The lower end of the lever 74 may be provided with a tubular hub 77 (Fig. 12) rotatable on the rock shaft 64 between the quadrant 75 and the plate 70. A releasable latch 78 carried by a plate 79 on the lever 74, is arranged to engage the notches 80 on the quadrant 75, and may have an outwardly bent lower end portion 81 movable in an elongated slot 80' in the lever 74 so as to be brought into and out of engagement with one of the notches 80. A coil spring 82 confined between a flange 83 on the plate 79 and a collar 84 on the latch 78, normally urges the latch downwardly into locking engagement with one of the notches 80. A flexible rod or wire 85 is connected at its lower end to the latch 77 as at 77' and at its upper end to a pivoted handle 85 on the lever 74 to control the operation of the latch 78 so as to rotate the shaft 64 by movement of the lever 74 and to maintain the parts in a fixed position. Each of the spaced cranks 67 and 68 is pivotally connected as at 86 to a depending link 87 which in turn is pivoted as at 88 to an upwardly extending fixed lug 89 carried by the transverse member 11 of the supporting frame 10. The pivots 88 also constitute a hinged connection for moving the rear of housing 24 relative to the front end thereof.

When the flail housing 24 and its associated parts are mounted on the supporting frames 10 and 17, the housing assembly will assume the position as shown in Figure 1, with the side bars 26 positioned above the side members 14 of the front supporting frame 10 and the inclined portions 28 positioned above the side members 16 of the wheel supporting frame 17 (Fig. 1). Each of the inclined rear portions 28 of the side bars 26 has an opening through which extends a set screw 90 which at its lower end has a universal or pivotal connection with a flat disc or plate 91 that bears against the adjacent upper surface of the side arms 16 of the wheel supporting frame. Each set screw 90 also extends through threaded locking nuts 93 and 93' disposed on opposite sides of the inclined portion 28 of the bar 26 (Fig. 3). The upper end of the set screw 90 may be formed with a polygonal head 92 for receiving a suitable tool for rotating the same. It will be seen that operation of the set screws 90 will cause the bars 26 and their associated parts to be moved about the front pivots 88 to raise or lower the housing 24 relative to the supporting frame 10 and the ground. It will also be observed that operation of the hand levers 74 to cause rotation of the rock shaft 64 will function to raise the front of the housing 24 and its associated parts about the rear pivots formed by the set screws 90 and their movable connections with the plates 91 that rest on the top of the inclined portions 28. Upwardly extending arms 94 are connected at their lower ends as at 95 to the side bars 14 of the front frame 10, and each may be flanged inwardly as at 96 to receive a depending adjustable bolt 97 to which is connected one end of a coil spring 98 that is secured at its lower end as at 99 (Fig. 3) to the angle bars 26. The springs 98 provide counterbalancing means for the housing 24 and are initially adjusted so as to provide maximum ease in the operation of the lever 74 for moving the housing 24 and its associated parts relative to the frame 10 and the ground. The side members 14 may be provided with inwardly extending pins or bolts 100 (Fig. 4) which are arranged to slide within a vertical slot 101 on plates 102, that are suitably secured to the ends 27 of the housing 24 so as to constitute a guide and retaining means for limiting the tilting movement of the flail housing and its associated parts relative to the frame 10.

In Figures 5, and 6, the rotor or drum 29 is shown provided on its outer periphery with axially spaced transverse rows of lugs 103 having aligned openings 104 and which are a sufficient width apart to receive between each adjacent pair of lugs, three flails or flexible beaters 105. The flails shown in Figure 5 are preferably molded or formed from a solid piece of rubber or rubber impregnated fabric, and each has a transverse inner end portion 106 (Fig. 8) provided with a through opening 107 which registers with the openings 104 in the transverse aligned lugs 103. The end portions 106 provide wide eyes for receiving the flail rods 108, and the flails provide relatively thick, heavy, flexible means for efficiently removing the tops of the plants without damaging the roots or body parts thereof. The aligned lugs 103 may be spaced so that one or more flails 105 may be positioned between each transverse pair of lugs and be connected in operative position on the rotor 29 by a single rod 108. The lugs 103 are circumferentially offset, and as shown, are arranged to receive six flail rods 108 uniformly spaced around the rotor 29. Manifestly, the lugs 103 may be used to connect any type of flail to the rotor, and the lugs may be disposed in any desired number and arrangement around the rotor 29 as the best operating conditions may require. Each of the end plates 31 has an enlarged opening 109 through which the flail rods 108 extend so as to connect the flails 105 to the rotor. To connect or remove the flails 105, each transverse row of lugs 103 is moved into alignment with the opening 109. In Figure 6, a modified form of rubber flail 105 is shown connected to the rotor 29 and this flail may have a strap 110 secured to its inner end as at 111 (Fig. 9) so as to provide a loop portion 112 for receiving the flail rod 108. Three of these straps are shown positioned between each transverse pair of lugs 103 and may be maintained in proper spaced position by rubber washers 113.

In the modified form of the invention shown in Figure 7, the rotor or drum 29 has secured to its outer periphery, transversely spaced U-shaped lugs 114, the spaced arms 115 of which are provided with transverse aligned openings 116 for receiving the flail rods 108 so as to detachably connect the flails to the rotor. As shown, a flail 105 having a looped strap 110 is connected to the drum by the rods 108, but it will be manifest that the arms 115 of the lugs 114 may be sufficiently spaced apart to receive a flail having an integral hub portion such as 106 for individually connecting the flails to the drum.

In Figure 10 the body 117 of the flail may be formed of metal and bent as at 118 to provide a vertical portion 119 having a forward cutting edge 120 and terminating in a cutter plate 121 disposed substantially at right angles to the portion 119 and provided with a forwardly disposed transverse cutting edge 122. The inner end of the flail may be connected to a strap 123 as at 124 and the strap provided with a loop 125 for receiving a retaining flail rod 108.

In the modified form shown in Figure 11, the flail 126 may be of flexible fabricated material and has connected to its outer end, the metal cutting members 127 which are disposed on opposite sides of the strap 126 and are secured thereto by the retaining means or bolts 128. The cutting members 127 are provided with angularly disposed portions 129 which extend in opposite directions from the flail 126 and are provided with outer cutting edges 130. The inner end of the flail 126 may be connected to the flail rods and the rotor in any suitable manner such as by the strap means 123 as shown in Figure 10.

The endless chain 36 and the sprocket wheels 35 and 37 may be enclosed in a casing 131 (Fig. 1) which is connected to the adjacent side bar 26 of the hood assembly by spaced brackets 132 that are connected as at 133 to the adjacent side bar 26 and are provided with outwardly extending arms 134 having openings 135 arranged to register with complementary openings 136 of the casing 131 that receive retaining bolts for detachably connecting the casing 131 to the machine. In all forms of the invention the flail connecting lugs are circumferentially disposed and offset on the drum so that the flails will be positioned to completely cover the area of the ground over which the machine operates without missing or skipping any of the tops of the vegetation to be removed.

It will be seen that the hood 24 and its associated parts, including the flail rotor 29 and the means for rotating the flails, are mounted as a unit on the main frame 10, and in such a manner that bodily movement of the flail housing assembly relative to the supporting frame 10, will cause the flails 105 to be moved vertically and be adjusted as to length relative to the ground. In other words, the housing 24 and its associated parts are normally supported on the frame 10 at the rear of the housing by the set screws 90 and at the front by the spaced links 87 and the balancing springs 98. Thus, both front and rear adjustments are provided for moving and maintaining the flails 105 at their proper distance from the ground in order to operate at maximum efficiency. The operator may initially set the screws 90 to approximately the height needed and then make the lesser and more frequent adjustments by operation of the hand lever 74. This adjustable feature is particularly desirable in view of the fact that the beater is capable of use on a great variety of crops, some of which are flat planted and many of which are planted on hills or ridges between furrows. In some conditions of work, the flails should be positioned so as to actually contact the soil or ground, while in other operations, they may swing as much as five or six inches above the ground and the vertical adjustment of the beaters provides means for readily and conveniently moving the flails to any desired position as may be required, at a minimum expenditure of time and effort.

In operation, assuming that the agricultural machine is connected through the tongue 12 and the plate 54 with the draw bar 58 of a tractor 53, and that the drive shaft 38 is operatively connected to the power take-off shaft 52 so as to cause rotation of the drum 29 and flails 105 at the desired speed, as the machine is propelled along the ground. If the beater is to be used to remove vegetables by a beating operation of the vines such as potato vines or beet tops, the machine is initially adjusted by first connecting the tongue 12 to the tractor 52 at the proper height through the insertion of the bolt 56 in the proper opening in the plate 54. The operating lever 74 is then moved from its normal inoperative position as shown in full lines in Figure 4, to the dotted line position, and this lowering of the lever will result in rotation of the rock shaft 64 which in turn, through the link connection 87, will raise the hood 24 and its associated parts including the flails 105, about the set screws 90 as rear pivots. Should further adjustment be necessary to move the flails to their proper operating positions relative to the ground, the set screws 90 may be unscrewed which will result in raising the rear wheel assembly 17 about its front pivots 88, thus permitting the housing 24 and the flail rotor or drum 29 and their associated parts, to be lowered in order that the flails assume their proper operative positions. Conversely, the raising of the lever 74 from its normal position as shown in Figure 4, will result in the lowering of the housing 24, flail drum 29 and their associated parts so that the flails are moved closer to the ground.

The turning of the revoluble member 29 at different rates of speed may be controlled by the operator of the tractor so that the flailing or beating action will insure proper de-vining and disintegrating of the particular vegetation with which the machine is used. Moreover, the rubber or thermoplastic solid flails 105 (Fig. 8) are of the proper size, length, hardness and composition, as to be durable in service and will efficiently de-vine sugar beets, carrots, onions, potatoes, and other crops without damage to the vegetables. Preferably six transverse rows of lugs 103 are spaced circumferentially and offset around the revoluble member 29 so that six flail rods 108 may be used to retain a complete set of flails in position, and which will allow the removal or addition of more flails as the particular working conditions may require.

As will be observed, three depth adjustments are provided for the beater: (1) the hitch connection through the vertical openings 55 in the plate 54; (2) the rear wheel adjustment through the set screws 90; (3) the frequent adjustment through the operating handle 74 and its associated parts. The height of the machine should be adjusted so that the flails clear the ground with the wheels 19 in the deepest corrugations and necessary changes should be made from that point in the field. When working in rows, the wheels may readily be laterally adjusted upon loosening of the clamps 21 so that they may be moved to their proper position on the bar 18 and then clamped thereto. It might be mentioned that it is not desirable to have the flails of such a length as to hit the ground, as this breaks the impact and not only wastes tractor power, but also decreases the efficiency of the flails in breaking or de-vining the vegetation being operated on.

To the rotor 29 may be connected any one of the types of flails shown and these flails may be interchangeably substituted one for the other as the best operating conditions may require. Moreover, the flails may be connected either separately or in groups to the rotor, so that they will cover a wide operating area and efficiently remove the tops of the plants or vines. The flail rods, it will be noted, are arranged to connect in a transverse row a number of flails and permit their attachment or removal from the rotor without disturbing the flails in the other transverse rows. Of course, the machine and the flail rotor may be used in association with various other types of flails for efficiently whipping or removing the tops of vegetable plants and the like.

In order that changes in the direction of rotation of the drum 29 and flails 105 within the housing 24 may be made at a minimum expenditure of time and effort, the gear box 46 may be turned through 90° as shown in Figure 1a, and connected to the drive shaft 38 through a universal connection 38' and the outer end of the shaft 38 connected to a chain driving mechanism similar to the chain 36 and its associated parts, but positioned on the side of the housing 24 opposite to that shown in Figure 1. In other words, means are provided for varying the direction of rotation depending upon factors which might be met in normal operation of the machine such as conditions of growth and availability of power. It might be mentioned, however, that in the majority of cases, the drum 29 and flails 105 rotate against or opposite to the direction of travel of the machine. The operating handle 74 preferably is of such a length as to be positioned close to the driver's seat of the tractor, so as to be conveniently operated by him.

By virtue of the means for adjusting the length of the flails, vines which are deep down in the furrow may be reached by shortening the flails over the hills and allowing the longer flails between the rows to reach the bottom of the furrow, thus insuring efficient operation of the machine under varying operating conditions.

The rotary beater is equally efficient for use for breaking up growth in orchards and disintegrating the tops of asparagus, onions, carrots, tomatoes and other vegetables, and eliminates vine disposition troubles.

It will be understood that the forms of the invention shown and described are merely illustrative of preferred embodiments and that such changes as come within the purview of one skilled in the art may be made without departing from the invention and the scope of the following claims.

We claim:

1. An agricultural machine of the class described including a front frame having spaced rearwardly extending sides, a rear frame having forwardly extending sides pivotally connected to the sides of the front frame, spaced ground-engaging wheels connected to said rear frame, a vertically displaceable flail housing mounted on said front and rear frames, angle bars connected to the sides of said housing, each of said angle bars having a forwardly extending substantially horizontal portion above the front frame and an upwardly inclined rearwardly extending portion above the sides of the rear frame, a revoluble member transversely mounted within the housing, flexible, heavy flails connected to said revoluble member and extending radially outwardly therefrom, means operatively connected to said revoluble member for rotating the flails, and means for moving the flail housing and the flails vertically relative to the front frame to adjust the length of the flails relative to the ground.

2. An agricultural machine of the class described including a wheel-supported frame arranged to travel along a row of plants, a flail housing bodily movable on the frame, said housing having bars secured to opposite sides thereof, each of said bars having a forwardly extending horizontal arm and an upwardly inclined rear arm, adjustable means connected to said rear arms and engaging said supporting frame and providing rear pivoted means for the housing, elevating mechanism mounted on the housing and connected to the front of the supporting frame for moving the housing relative to the frame and about said rear pivoted means, a flail rotor transversely mounted within the housing, driving means carried by said housing and operatively connected to said rotor, and flexible flails connected to the rotor and extending radially outwardly therefrom for engaging the plants to remove the tops therefrom when the machine is in operation.

3. An agricultural machine of the class described including a wheel-supported frame arranged to travel along a row of plants, a flail housing bodily movable on the frame, said housing having a forwardly extending transverse flange, said housing having bars secured to opposite sides thereof, each of said bars having a forwardly extending horizontal arm and an upwardly inclined rear arm, adjustable means connected to said rear arms and engaging said supporting frame and providing rear pivoted means for the housing, elevating mechanism mounted on the flange of the housing and connected to the front of the supporting frame for moving the housing relative to the frame and about said rear pivoted means, yieldable means connecting the front of the housing to the sides of the supporting frame, a flail rotor transversely mounted within the housing and rotatably supported on said bars, driving means carried by said housing and operatively connected to said rotor, and flexible flails connected to the rotor and extending radially outwardly therefrom for engaging the plants to remove the tops therefrom when the machine is in operation.

4. An agricultural machine as called for in claim 3, in which the elevating mechanism includes a rock shaft mounted on the transverse flange of the housing, means pivotally connecting the rock shaft to the frame, and an operating lever connected to the rock shaft to move the housing about its rear pivotal means so as to vary the distance of the flails relative to the ground.

5. An agricultural machine as called for in claim 3, in which the elevating mechanism includes spaced supporting brackets on said transverse flange, a rock shaft rotatably mounted in said brackets, said rock shaft having outwardly extending spaced cranks, links pivotally connecting said cranks to the front of said supporting frame, a lever operatively connected to said rock shaft, and means associated with the lever for releasably maintaining the same in a fixed position.

6. An agricultural machine of the class described including a wheel-supported frame arranged to travel along a row of plants, a flail housing bodily movable on the frame, means pivotally connecting the front of the housing to said frame, means adjustably connecting the rear of the housing to said frame, said adjusting means also constituting rear pivotal means about which the front of the housing may be moved relative to the frame, means operatively connected to the front of the housing for moving the same about the rear pivotal means, a rotor mounted within said housing, flexible, heavy flails connected to said rotor and extending radially and outwardly therefrom, and means operatively connected to the rotor for rotating the same so as to cause the flails to engage the plants and remove the tops therefrom during the operation of the machine.

7. An agricultural machine of the class described including a wheel-supported frame arranged to travel along a row of vegetable plants, a flail housing bodily movable on the frame, said housing having bars secured to opposite sides thereof, each of said bars having a forwardly extending horizontal arm and an upwardly inclined rear arm, set screws connected to said rear arms and engaging said frame and providing rear pivoted supporting means for the housing, elevating mechanism mounted on the housing and connected to the front of the frame for moving the housing relative to the frame and about said rear pivoted means, a flail rotor transversely mounted within the housing, driving means carried by said housing and operatively connected to said rotor for rotating the same, said set screws coacting with the elevating mechanism to provide additional means for moving the housing to adjust the flails relative to the ground, and flexible flails connected to the rotor and extending radially outwardly therefrom for engaging the plants to remove the tops therefrom when the machine is in operation.

8. An agricultural machine as called for in claim 7, in which the driving means includes a drive shaft, means movably connecting the drive shaft to the supporting frame, a gear box connected to the drive shaft and a transverse propeller shaft mounted on the housing and operatively connected to the gear box and to said flail rotor, and said driving means being bodily movable upon displacement of the housing by the elevating mechanism.

9. An agricultural machine of the class described including a wheel-supported frame arranged to travel along a row of plants, a vertically displaceable flail housing movable on the frame, said housing having members secured to opposite ends thereof, each of said members comprising a forwardly extending substantially horizontal portion and an upwardly inclined rear portion, adjustable means connected to the inclined rear portions and engaging said supporting frame, said adjustable means constituting a rear pivotal support for the housing and the frame when moving the front of the housing relative to the frame, yieldable means connecting the front of the housing to said supporting frame, means operatively connected to the front of the housing for moving the same vertically relative to the supporting frame, a flail drum transversely mounted within the housing and having a shaft extending outwardly from a side thereof, means operatively connected to said shaft for rotating said drum, and flexible flails connected to said drum and extending radially outwardly therefrom for removing the tops of the plants during the operation of the machine.

10. An agricultural machine as called for in claim 9, in which the drum is provided with means for detachably connecting the flails thereto, and said means are arranged in transverse rows circumferentially offset relative to one another.

HAROLD J. AGEE.
PAUL K. COWGILL.
JOHN D. GORDON.

REFERENCES CITED

The following references are of record in the file of this patent:

UNITED STATES PATENTS

| Number | Name | Date |
|---|---|---|
| 1,862,035 | Rainwater | June 7, 1932 |
| 1,870,932 | Sternemann | Aug. 9, 1932 |
| 2,250,948 | Garst | July 29, 1941 |
| 2,341,486 | Swertfeger | Feb. 8, 1944 |
| 2,354,112 | Garst | July 18, 1944 |

FOREIGN PATENTS

| Number | Country | Date |
|---|---|---|
| 507,243 | Germany | Sept. 13, 1930 |